United States Patent
Odenwald et al.

(10) Patent No.: US 6,629,156 B1
(45) Date of Patent: Sep. 30, 2003

(54) FIBRE CHANNEL SERVICE PARAMETER CACHE

(75) Inventors: Louis Odenwald, Witchita, KS (US); William Ortega, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/517,817

(22) Filed: Mar. 2, 2000

(51) Int. Cl.[7] .............................................. G06F 3/00
(52) U.S. Cl. ............................ 710/8; 711/118; 711/129
(58) Field of Search ...................... 710/8–14; 711/118, 711/129

(56) References Cited

U.S. PATENT DOCUMENTS

| | | | |
|---|---|---|---|
| 5,598,541 A | * 1/1997 | Malladi | 709/212 |
| 5,768,530 A | * 6/1998 | Sandorfi | 709/233 |
| 5,805,924 A | * 9/1998 | Stoevhase | 710/11 |
| 5,842,040 A | * 11/1998 | Hughes et al. | 710/11 |
| 5,848,251 A | * 12/1998 | Lomelino et al. | 710/305 |
| 5,954,796 A | 9/1999 | McCarty et al. | |
| 5,956,723 A | 9/1999 | Zhu | 707/100 |
| 5,978,379 A | 11/1999 | Chan et al. | |
| 5,983,309 A | 11/1999 | Atsatt | |
| 6,057,863 A | * 5/2000 | Olarig | 345/501 |
| 6,138,161 A | 10/2000 | Reynolds et al. | |
| 6,141,731 A | * 10/2000 | Beardsley et al. | 711/133 |
| 6,195,703 B1 | 2/2001 | Blumenau et al. | |
| 6,195,705 B1 | 2/2001 | Leung | |
| 6,199,112 B1 | 3/2001 | Wilson | |
| 6,353,612 B1 | * 3/2002 | Zhu et al. | 370/360 |
| 6,401,128 B1 | 6/2002 | Stai et al. | |
| 6,421,711 B1 | 7/2002 | Blumenau et al. | |
| 6,421,723 B1 | 7/2002 | Tawil | |
| 6,421,753 B1 | 7/2002 | Hoese et al. | |
| 6,425,034 B1 | * 7/2002 | Steinmetz et al. | 370/402 |
| 6,430,182 B1 | * 8/2002 | Oyama | 370/388 |
| 6,430,645 B1 | 8/2002 | Basham | |
| 6,490,654 B2 | * 12/2002 | Wickeraad et al. | 711/133 |
| 6,587,874 B1 | * 7/2003 | Golla et al. | 709/220 |

\* cited by examiner

*Primary Examiner*—Jeffrey Gaffin
*Assistant Examiner*—Eron J. Sorrell
(74) *Attorney, Agent, or Firm*—Christopher P. Maiorana, PC (57) ABSTRACT

An apparatus comprising a first circuit and a second circuit. The first circuit may be configured to obtain a number of service parameters from a network device. The second circuit may be configured to store (i) a first portion of the service parameters in a first group comprising identification parameters, a number of pointers, and a control field and (ii) one or more second portions of the service parameters in one or more second groups, each comprising a communication parameter and a counter. Each of the number of pointers points to a null address or one of the one or more second groups.

24 Claims, 5 Drawing Sheets

| FC SERVICE PARAMETERS | BYTES |
|---|---|
| Common Service Parameters | 16 |
| World Wide Port Name | 8 |
| World Wide Node Name | 8 |
| Class 1 Service Parameters | 16 |
| Class 2 Service Parameters | 16 |
| Class 3 Service Parameters | 16 |
| Reserved | 16 |
| Vendor Version Level | 16 |
| | 112 |

FIBRE CHANNEL SERVICE PARAMETER CACHE

FIELD OF THE INVENTION

The present invention relates to computer networks generally and, more particularly, to an apparatus and method for caching network communication parameters.

BACKGROUND OF THE INVENTION

Fiber Channel (FC) is an integrated set of standards developed by the American National Standards Institute (ANSI). FC allows for a switching network, called a fabric, to intelligently manage interconnections between a number of connection points, called N_Ports. All that is required of the N_Ports is to initiate a point-to-point connection between one port and a port (F_Port) of the fabric. However, the presence of a fabric is not necessary, as FC provides for topologies without a fabric, as in the case of a simple point-to-point link between two N_Ports, or a Fiber-Channel Arbitrated Loop (FC-AL).

A more complete description of the Fiber-Channel standard can be found in the proposed drafts of the American National Standard for Information Systems (ANSI), Fiber-Channel-Physical and Signaling Interface (FC-PH), Jun. 1, 1994, Rev 4.3, Fiber-Channel-Physical and Signaling Interface-2 (FC-PH-2), Sep. 10, 1996, Rev. 7.4, and Fiber-Channel Physical and Signaling Interface-3 (FC-PH-3), Aug. 19, 1997, Rev. 9.3 which are each hereby incorporated by reference in their entirety.

Communication between N_Ports is based on the transfer of data frames and Link_Control frames resulting from information transfer requests from other N_Ports. The primary function of the fabric is to receive frames from a source N—Port and route the frames to a destination N_Port. According to the FC standard, each N_Port has a permanent unique identifier that is worldwide unique. The permanent unique identifier is called a World Wide Node Name and Port Name (WWN). The WWN is part of a group of values called service parameters. Service-parameters establish the receive and transmit characteristics of an N_Port. The exchange of service parameters is required for communication between N_Ports.

A number of classes of service are supported by the Fiber-Channel standard. These classes specify the method of connection between the N_Ports, the bandwidth available and the delivery integrity of the communication. The classes of service supported by the fabric are specified in the service parameters of the fabric. To communicate with the fabric or another N_Port, an N_Port exchanges service parameters with the fabric or the other N_Port. Initially, communication is according to a fabric login protocol or an N_Port login protocol, respectively. Conversely, when an N_Port wishes to sever communications with the fabric or another N_Port, an F_Port or an N_Port logout protocol is used to request removal of service parameters from the fabric or the other N_Port.

Presently most Fiber Channel networks are based on the Fiber Channel arbitrated loop protocol (FC-AL-2). FC-AL-2 limits the number of devices on a loop to 127. However, another protocol that is becoming more prominent is the Fiber Channel fabric to loop attachment protocol (FC-FLA). A Fiber Channel network using FC-FLA can support $2^{24}$ devices.

Once a device is logged in, the login persists until an implicit or explicit logout occurs. The number of N_Ports with which an N_Port may be logged in is only limited by the available functionality and resources (e.g., memory) of the N_Port. A large server may potentially communicate with thousands of devices in a fabric environment (i.e., the server port may have to login with thousands of N_Ports).

Figure 1:
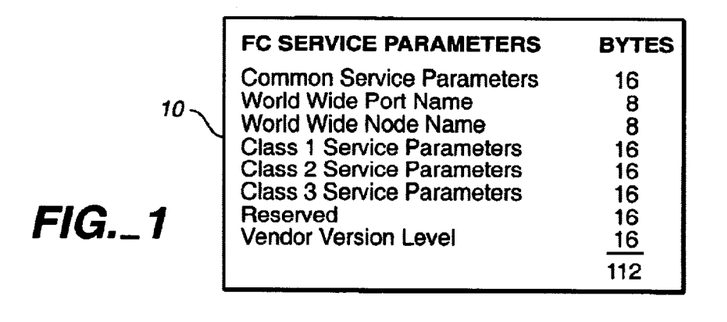
FIG. 1 is a list of service parameters used in a Fiber Channel network.

Referring to FIG. 1, a list 10 of service parameters is shown. The login service parameters include Common Service Parameters, a World Wide Port Name, a World Wide Node/Fabric Name, Class 1, Class 2 and Class 3 service parameters, a Vendor Version Level and sixteen reserved bytes. According to the conventional method, upon completion of the login procedure, the service parameters are stored until the F_Port and the N_Port, or the two N_Ports, log each other out, either explicitly or implicitly. Maintaining the login service parameters of thousands of logged-in N_P is costly in terms of memory storage requirements. An N_Port or an F_Port login service parameter payload is 112 bytes, excluding the command code, and may be as many as 252 bytes, excluding the command code, as set forth in FC-PH-3, Rev. 9.3. For example, an initiator and 126 target devices on a loop would require one hundred twenty-six individual service parameter blocks to be cached. Since the size of the service parameters for a port can be as large as 112 bytes (252 bytes for Rev. 9.3), the initiator on the loop in the present example would have to set aside up to 14,112 bytes (e.g., 126×112) of memory to store the service parameters.

In a large server environment, an FCP initiator N_Port talking to 1,000 FCP target N_Ports is not unusual. A public loop is able to support up to $2^{24}$ devices. To store the 1000 associated service parameters alone requires more than 100K Bytes of memory space. To commit over 100K Bytes of memory space for storing service parameters alone is often not acceptable. Especially, when login services are performed at the firmware level.

Likewise, in large networks of computers, computer peripherals and like devices, the interconnected devices often are assigned a unique identifier which defines the identification, characteristics and requirements of the device. These unique identifiers must be maintained in memory, and the storage requirements for doing so can be quite burdensome in terms of system resources.

Without a cache, service parameter memory requirements will normally grow linearly with the number of devices attached. The potential growth of the memory required makes memory management on embedded systems difficult.

A solution is needed for reducing the memory storage overhead required to keep track of network service parameters. Such a solution should reduce the amount of memory needed to maintain the parameters without sacrificing access thereto or functionality.

SUMMARY OF THE INVENTION

The present invention concerns an apparatus comprising a first circuit and a second circuit. The first circuit may be configured to obtain a number of service parameters from a network device. The second circuit may be configured to store (i) a first portion of the service parameters in a first group comprising identification parameters, a number of pointers, and a control field and (ii) one or more second portions of the service parameters in one or more second groups, each comprising a communication parameter and a counter. Each of the number of pointers points to a null address or one of the one or more second groups.

The objects, features and advantages of the present invention include providing an apparatus and method that may (i)

require less memory to maintain a number of unique device identifiers in memory while not sacrificing access thereto and functionality, and/or (ii) re-acquire login service parameters without disturbing a network environment.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 2:
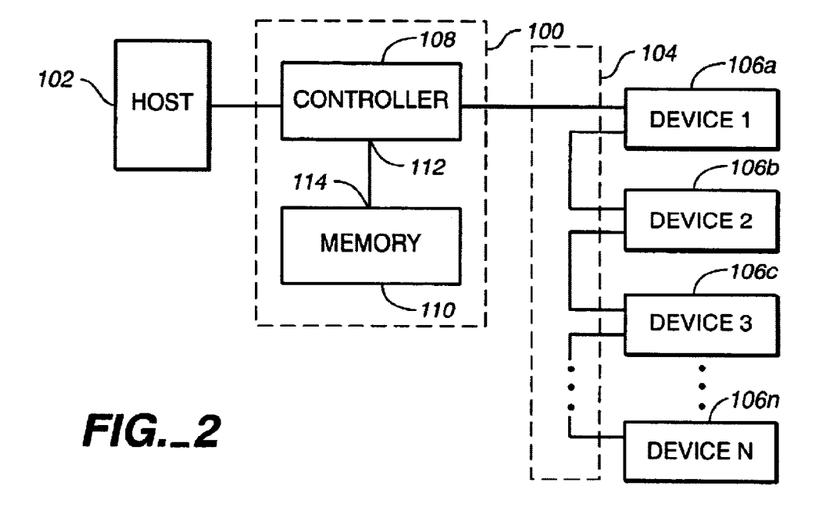
FIG. 2 is a block diagram of illustrating a preferred embodiment of the present invention.

Referring to FIG. 2, a block diagram of a circuit 100 is shown in accordance with a preferred embodiment of the present invention. The circuit 100 may be, in one example, an FC-FCP Initiator. The circuit 100 may be connected between a host 102 and a loop (or fabric) 104. The connections between the circuit 100 and the host 102 may be, in one example, a PCI or system bus. The loop 104 may be connected to one or more network devices 106a–106n. The host 102 may be, in one example, a microprocessor (e.g., a server). The network devices 106a–106n may be, in one example, other microcomputers or mass storage devices (e.g., hard drives, CD-ROM drives, zip-drives, etc.). However, the network devices 106a–106n may be implemented as other types of network devices to meet the design criteria of a particular implementation. The circuit 100 may be configured to manage communications between the host 102 and the network devices 106a–106n.

The circuit 100 may comprise, in one example, a circuit 108 and a circuit 110. The circuit 108 may be implemented, in one example, as a controller circuit. The circuit 110 may comprise, in one example, a memory circuit. In one example, the circuit 110 may comprise volatile and/or non-volatile memory. An input/output 112 of the circuit 108 is generally connected to an input/output 114 of the circuit 110. The circuit 108 may be configured to store service parameters received from the target devices 106a–106n in the circuit 110.

The circuit 100 may be configured to maintain a cache for storing the service parameters of the devices 106a–106n. The circuit 100 may keep service parameters of ports that are currently communicating with the host 102. The circuit 100 may be configured to discard service parameters of ports using predetermined caching methods when memory is needed for other uses. The circuit 100 may be further configured to reacquire the discarded service parameters without disturbing the operating environment previously established.

As a port comes up on a loop it generally starts logging into (e.g., sending a LOGI signal), and gathering service parameters for, other ports with which the port wishes to communicate. The basic link service login signal (LOGI) generally encompasses both FLOGI (fabric login) and PLOGI (port login), together with their associated basic link response accept signal (ACC) and provides for the exchange of service parameters between ports. If the number of ports logged into starts to strain memory resources, the circuit 100 may be configured to discard some of the service parameter data. However, a logout from the ports whose service parameters are discarded is generally not performed. Instead, information is generally kept resident to allow the reacquisition of the discarded service parameters without actually re-logging into the particular port (e.g., sending a signal LOGI).

Figure 3:
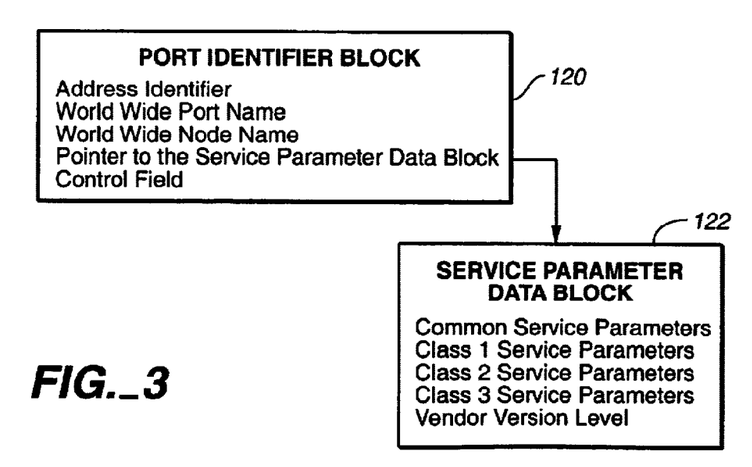
FIG. 3 is a block diagram illustrating an initial division of service parameters.

Referring to FIG. 3, a block diagram illustrating service parameters divided into two blocks is shown. Service parameters are generally split up into a first block 120 (e.g., a port identifier block) and a second block 122 (e.g., a service parameter data block) as they are received. The port identifier block 120 generally remains resident in memory for as long as the port maintains a valid login. The service parameter data block 122 generally contains the bulk of the service parameters and is generally the portion that may be discarded. A method for maintaining login service parameters as a linked list of first parts and a common second part may be found in U.S. Pat. No. 5,956,723, which is incorporated by reference in its entirety.

The port identifier block 120 generally contains the World Wide Port Name and the World Wide Node Name that uniquely identify the associated port, a current address identifier for the port, a control field, and a pointer to the service parameter data block 122 for the port. However, the pointer to the service parameter data block 122 may, in one example, point to a block that contains pointers to one or more service parameter data blocks 122 as discussed later with respect to FIG. 5. Multiple levels of pointers may be implemented to meet the design criteria of a particular application. The service parameter data block 122 generally contains the common, the class 1, the class 2 and the class 3 Service Parameters as well as the vendor version level of the port.

In the course of operations, a point may be reached in which all of the allotted memory resources for service parameter storage are consumed. When a requirement arises to start communicating with a new device and sufficient memory is not available, an appropriate service parameter data block 122, associated with a device suitable to being dropped from the cache, is generally discarded and the associated pointer in the port identifier block 120 is generally set to a null address. The freed memory may be used to store the service parameters of the new device after a login (e.g., a LOGI signal and a ACC response) is established. Sufficient memory will generally have to be available to also store a port identifier block 120 for the new device.

The circuit 100 may use one of a number of known caching methods to determine which service parameter data block 122 to discard from the circuit 110. Methods may include, in one example, (i) a search for the first device found which does not presently have an "open exchange" associated with it, (ii) the least recently used device, and/or (iii) any device that does not currently have a sequence queued up for transmission.

The port identification block 120 is generally maintained for the life of the login. Discarding the port identifier block 120 is generally comparable to an implicit logout. If the port identifier block 120 is discarded, a new login (e.g., a LOGI signal) is generally needed to reestablish the service parameters before any further communication may occur. A new login is generally undesirable because transmission of a LOGI signal generally implies an implicit logout when a login is already established. The implicit logout will generally force the termination of any open exchanges or sequences established between the ports. For example, if an implicit logout takes place between an initiator and a network device in the process of conducting I/O activity, all open I/Os will generally be terminated regardless of their status.

When the port identifier block 120 is kept resident after the service parameter data block 122 has been discarded, an extended link service signal (e.g., PDISC or FDISC) may be used to reacquire the service parameters previously discarded. The extended link service signal PDISC is normally used only during target discovery following a loop initialization to determine what ports are logged in. The signal PDISC, unlike the signal LOGI, does not imply an implicit logout. The operating environment is left generally unchanged and any open exchanges or sequences are generally not terminated.

The circuit 100 may use, in one example, the World Wide Port Name, the World Wide Node Name, and the address identifier stored in the port identifier block 120 to verify the authenticity of a port. When an-acknowledgment signal (e.g., ACC) is received in response to the signal PDISC, the World Wide Port Name, World Wide Node Name, and address identifier are generally compared to the stored values. If the values match, the service parameters are generally reestablished by copying them into a service parameter data block 122 and updating the pointer in the associated port identifier block 120. Communication with the port may then proceed. If the values do not match, a logout signal (e.g., LOGO) is received instead of the signal ACC, or the port cannot be opened (e.g., no response to a signal OPN), the port is generally considered to have either changed address or been removed from the loop. For example, an arbitrated loop physical address (AL_PA) of a port may have changed following a loop initialization (e.g., Lip). If the arbitrated loop physical address (AL_PA) changes or the port is removed from the loop, an implicit logout is generally considered to have taken place and a new login is generally needed.

Figure 4:
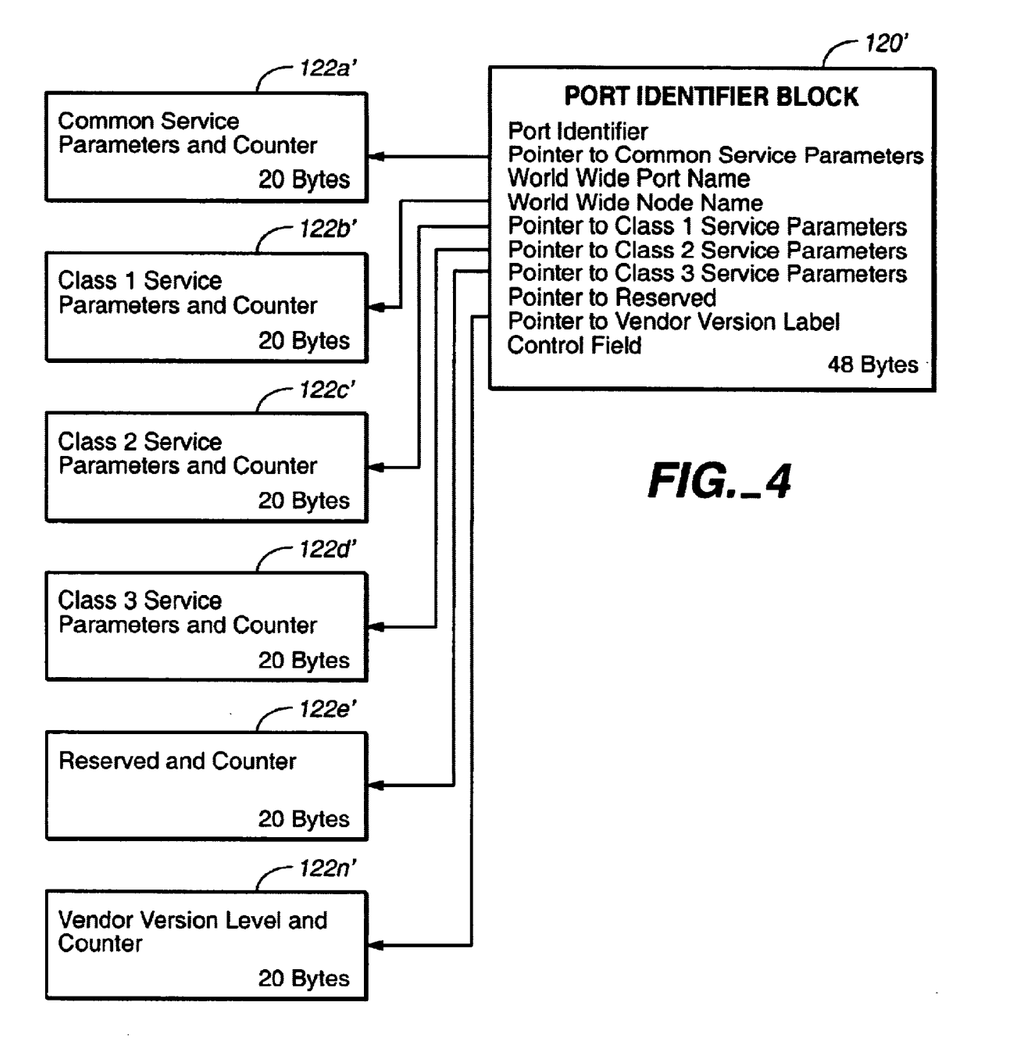
FIG. 4 is a block diagram illustrating a further division of stored service parameters in accordance with the present invention.

Referring to FIG. 4, a block diagram illustrating a further division of stored service parameters is shown. In an alternative embodiment, the circuit 100 may be configured to split up service parameters associated with a port login into individual parameter blocks 122a'–122n' and associate the parameter blocks to the port identifier block 120' using one or more pointers. Initially, this may lead to an increase in memory requirements for storing the service parameters (e.g., 168 bytes verses 112 bytes before the optimization) The individual parameter blocks 122a'–122n' may include a counter. The counter may be implemented, in one example, as a four byte counter. The counter in the service parameter blocks 122a'–122n' is generally incremented for each port sharing the block and decremented when a port sharing the block logs out. When the last port associated with a particular service parameter block logs out, the block is generally discarded. The counter may be used, in one example, in cache management decisions concerning whether to discard a particular block.

Figure 5:
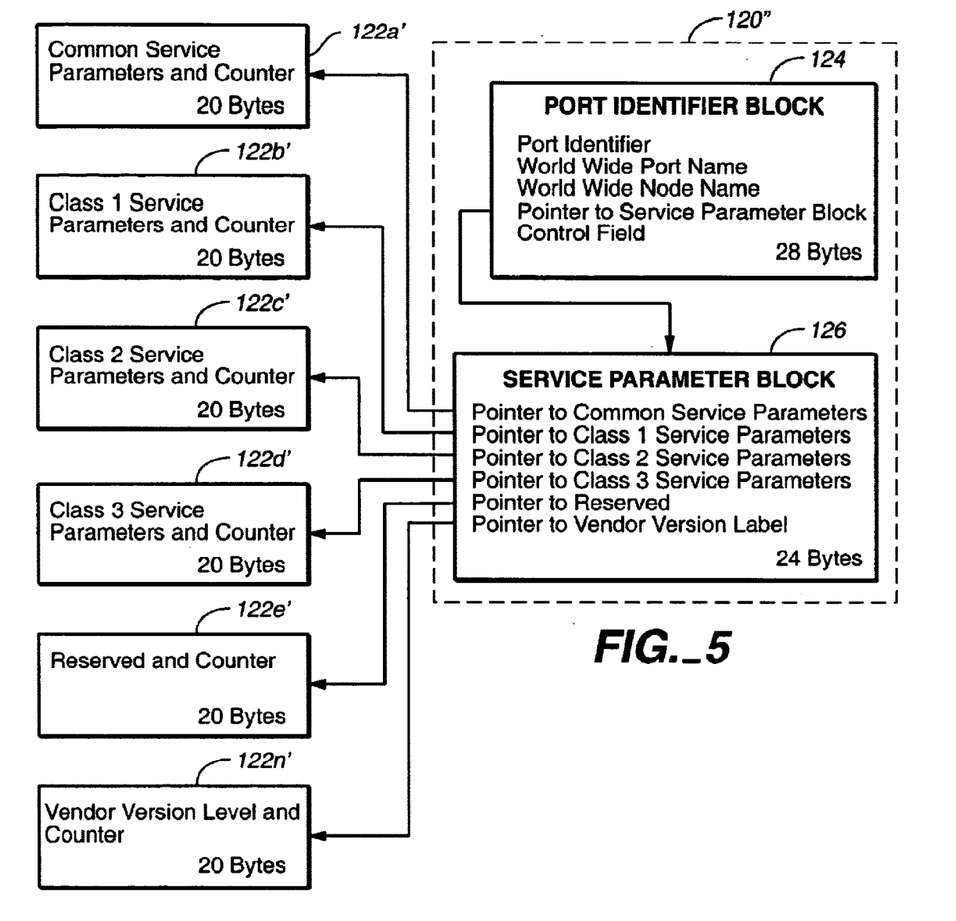
FIG. 5 is a block diagram illustrating an alternative embodiment of the present invention.

Referring to FIG. 5, a block diagram illustrating another alternative embodiment of the present invention is shown. The circuit 100 may be configured to split the port identifier block 120" into a block 124 and a block 126. The circuit 100 may be configured, in one example, to place the port identification parameters, address identifier, and control field into the block 124 and the pointers to the service parameters into the block 126. A pointer in the block 124 may be used to associate the block 124 with the block 126.

Similarly, when a number of devices use the same grouping of service parameters, the circuit 100 may be configured to split the respective blocks 120a"–120n" (not shown) into blocks 124a–124n and 126a–126n, respectively. Since the devices use the same grouping of service parameters, the blocks 126a–126n will generally be the similar. The circuit 100 may be configured, in one example, to discard all but one of the blocks 126a–126n and set the pointer in each of the blocks 124a–124n to point to the remaining block (e.g., block 126i). The counters in the blocks 122a'–122n' will generally be updated to reflect the number of devices associated with the block 126i

Figure 6:
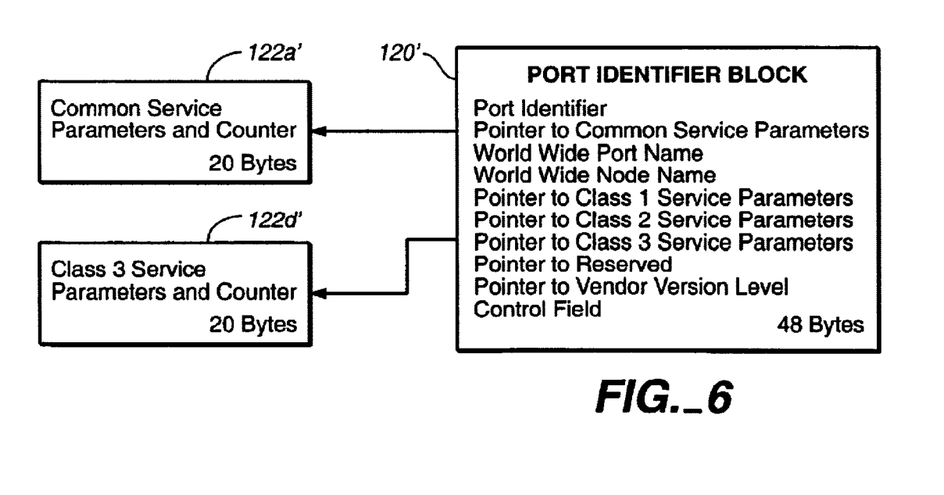
FIG. 6 is a block diagram illustrating a reduction in stored parameters in accordance with the present invention.

Referring to FIG. 6, a block diagram illustrating a reduction in stored parameters in accordance with the present invention is shown. In general, not everything in the service parameters is of use. If the network device does not support a specific class of service or the port in which the service parameters are being collected does not itself support specific classes, the classes may be discarded. The circuit 100 may be configured to discard unsupported classes, generally freeing up the associated memory and replacing the memory address for the freed memory with a NULL address. The circuit 100 may use the control field to determine whether a pointer containing a NULL address indicates that (i) the class of service is not available (e.g., not supported by the host or the network devices) or (ii) the service parameter has been discarded and must be reestablished. Other individual parameter blocks 122a'–122n' that are not needed may be discarded in a similar manner (e.g., blocks holding the reserved and vendor Version Level). If the remaining service parameters are similar, only one of the service parameters will generally be kept. The service parameter will generally be shared by relevant pointers in the port identifier block 120'. For example, if a device only supports the class 3 service, the port identifier block 120' and the service parameter block 122d' may be stored in 88 bytes, a savings of 24 bytes per port.

Figure 7:
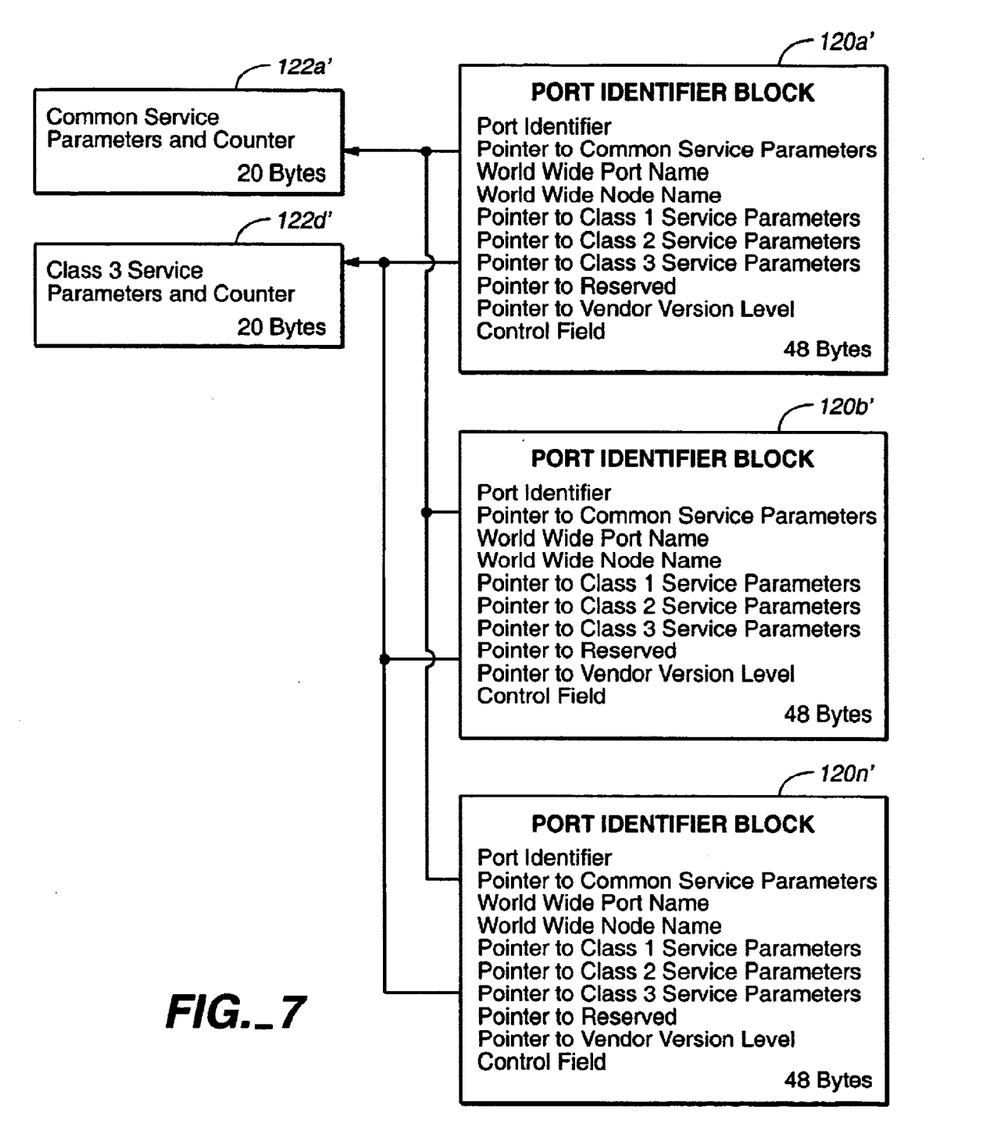
FIG. 7 is a block diagram illustrating sharing communication parameters to further reduce memory requirements.

Referring to FIG. 7, a block diagram illustrating the circuit 100 sharing communication parameters to further reduce memory requirements is shown. In a large loop or fabric containing many devices with similar service parameters except for the World Wide Names (WWN), each port identifier block 120a'–120n' may have a pointer to the same service parameter block (e.g., a block 122i'). For example, the circuit 100 attached to a loop with three similar fixed disk drives with common and class 3 service parameters that are identical for each drive will generally use 184 bytes to store the service parameters of the three drives, as opposed to 336 bytes (3*112).

In general, the circuit 100 may be configured to minimize the number of service parameter blocks 122a'–122n' that are kept and linked via the pointers to the port identifier blocks 120a'–120n'. Each of the service parameter blocks 122a'–122n' that are kept, will generally contain a service parameter that is distinct from the other service parameter blocks. Each port will generally have a unique port identifier block 120a'–120n', but may share one or more service parameter blocks 122a'–122n' when similarities occur. The present invention may reduce the total amount of memory required, for example, in a network environment that contains large numbers of devices that have similar service parameters (e.g., a Fiber Channel network).

Figure 8:
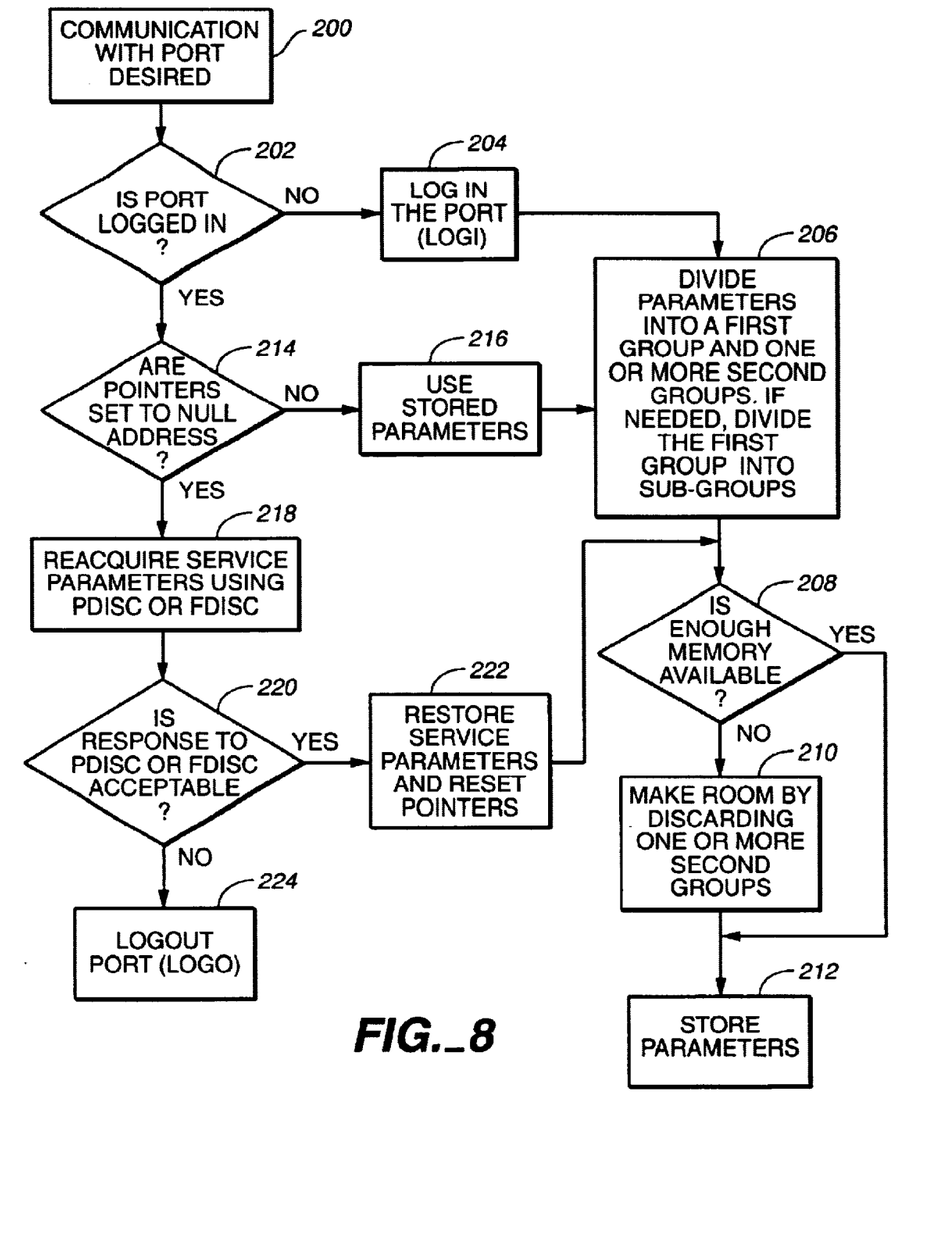
FIG. 8 is a flow diagram illustrating an example operation of the present invention.

Referring to FIG. 8, a flow diagram illustrating an example operation of the circuit 100 is shown. To communicate with one of the network devices 106a–106n, the circuit 100 begins a process to determine the service parameters (e.g., block 200). The circuit 100 generally checks to see whether the particular port is logged in (e.g., block 202). If the port is not logged in (e.g., the circuit 100 is starting up or the port is new), the circuit 100 generally executes a basic link service login (LOGI) to establish the service parameters of the port (e.g., block 204).

The circuit 100 generally divides the established service parameters into a port identifier block 120 and one or more service parameter blocks 122 (e.g., block 206). However, the circuit 100 may divide the port identifier block 120 into sub-groups to provide one or more levels of pointers depending on the design criteria of a particular application (e.g., block 206). The circuit 100 generally checks to see that enough memory is available to store the port identifier block 120 and the associated service parameter blocks 122 (e.g., block 208). If the needed memory is not available, the circuit 100 generally frees up enough memory by discarding one or more service parameter blocks 122 according to a predetermined cache maintenance method (e.g., block 210). When enough memory is available, the circuit 100 generally stores the port identifier block 120 and either (i) stores the service parameter blocks 122 and sets the pointers of the port identifier block 120 to the new service parameter blocks 122 or (ii) sets the pointers in the port identifier block 120 to existing service parameter blocks 122 (e.g., block 212).

If the port is logged in, a port identifier block 120 will generally be present. The circuit 100 generally checks to see whether the pointers are set to a NULL address (e.g., block 214). If the pointers are not set to a NULL address, the circuit 100 generally uses the parameters in the service parameter block 122 to which the pointer points (e.g., block 216). If the pointers are set to a NULL address, the circuit 100 generally begins a process of reacquiring the service parameters for the particular device (e.g., block 218).

In order to reacquire the service parameters, the circuit 100 generally executes a discovery extended link service (e.g., PDISC, FDISC, etc.) to retrieve the service parameters without affecting the network environment (e.g., block 218). If the response to the discovery extended link service is verified against the port identifier block 120, the circuit 100 generally copies the service parameters contained within the response to service parameter blocks 122 according to the process described above in reference to blocks 208–212 (e.g., block 222). If the response cannot be verified against the port identifier block 120, the circuit 100 generally executes a basic link service logout (e.g., LOGO) as shown in block 224.

Although the present invention finds particular application in a Fiber Channel environment, it is not limited thereto. The method according to the present invention is applicable to any computing system, environment or standard where each network device of the system is assigned a unique identifier, and must exchange that identifier with other network devices of the system in order to exchange information. The present invention is applicable to any environment in which information, whether called login service parameters, WWNs or some other names, regarding particular devices or modules must be exchanged before communication can take place.

The function performed by the circuit 100 of FIG. 2 and or described in the flow diagrams of FIG. 8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s). The present invention may also be implemented by the preparation of ASICs, FPGAs, or by interconnecting an appropriate network of conventional component circuits.

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
 a first circuit configured to obtain a number of service parameters from a network device;
 a second circuit configured to store (i) a first portion of said service parameters obtained by said first circuit in a first group comprising identification parameters, a number of pointers, and a control field and (ii) one or more second portions of said service parameters in one or more second groups, each of said one or more second groups comprising a communication parameter and a counter, wherein each of said number of pointers points to a null address or one of said one or more second groups and each of said number of pointers pointing to said null address is interpreted based upon said control field.

2. The apparatus according to claim 1, wherein said apparatus comprises a fibre channel initiator.

3. The apparatus according to claim 1, wherein said identification parameters comprise one or more of a World Wide Port Name, a World Wide Node Name, and an address identifier.

4. The apparatus according to claim 1, wherein said first group is further divided into (i) a first sub-group comprising identification parameters and said control field and (ii) one or more second sub-groups comprising one or more of said number of pointers.

5. The apparatus according to claim 1, wherein said communication parameters comprise one or more parameters from a group consisting of common service parameters, class 1 service parameters, class 2 service parameters, class 3 service parameters, reserved service parameters, and a vendor version level label.

6. The apparatus according to claim 1, wherein one or more of said second groups are discarded to increase available memory.

7. The apparatus according to claim 6, wherein said second groups are discarded according to a predetermined caching method.

8. The apparatus according to claim 6, wherein said second groups are discarded according to a value contained in said counters associated with said second groups.

9. The apparatus according to claim 1, wherein said communication parameters of a discarded second group are reacquired using an extended link service signal.

10. The apparatus according to claim 9, wherein said extended link service signal comprises a PDISC signal or a FDISC signal.

11. The apparatus according to claim 1, wherein a number of said second groups is determined by a number of services supported by said network device.

12. The apparatus according to claim 1, wherein a number of said second groups is determined by a number of services supported by said apparatus.

13. The apparatus according to claim 1, wherein:

said first circuit is configured to obtain said service parameters from said network device using one or more signals selected from a group consisting of LOGI, FDISC, PDISC, and ACC; and said second circuit is configured to divide said service parameters such that (i) said first group comprises a World Wide Port Name, a World Wide Node Name, an address identifier, said number of pointers, and said control field and (ii) each of said number of second groups comprises said counter and a different service parameter selected from the group consisting of a common service parameter, a class 1 service parameter, a class 2 service parameter, a class 3 service parameter, a reserved parameter, and a vendor version level label.

14. The apparatus according to claim 1, wherein said control field is configurable to indicate that one or more of said number of pointers pointing to said null address indicates a class of service is not available.

15. The apparatus according to claim 1, wherein said control field is configurable to indicate that one or more of said number of pointers pointing to said null address indicates that one or more service parameters have been discarded.

16. An apparatus comprising:

means for obtaining service parameters from a network device;

means for storing (i) a first portion of said service parameters obtained by said obtaining means in a first group comprising identification parameters, a number of pointers, and a control field and (ii) one or more second portions of said service parameters in one or more second groups, each of said one or more second groups comprising a communication parameter and a counter, wherein each of said number of pointers points to a null address or one of said one or more second groups and each of said number of pointers pointing to said null address is interpreted based upon said control field.

17. A method for minimizing the amount of memory needed to cache fibre channel service parameters comprising the step of:

(A) obtaining a number of service parameters from a network device;

(B) storing (i) a first portion of said service parameters in a first group comprising identification parameters, a number of pointers, and a control field and (ii) one or more second portions of said service parameters in one or more second groups, each of said one or more second groups comprising a communication parameter and a counter, wherein each of said number of pointers points to a null address or one of said one or more second groups and a pointer pointing to said null address is interpreted based upon said control field.

18. The method according to claim 17, wherein said first group is maintained from login until logout.

19. The method according to claim 17, wherein said second groups comprising unsupported services are discarded.

20. The method according to claim 17, further comprising:

storing a different first group for each of a plurality of network devices connected to said apparatus.

21. The method according to claim 17, wherein said counter indicates how many connected network devices are sharing said communication parameter associated with said counter.

22. The method according to claim 17, further comprising the step of discarding a particular one of said one or more second groups when said counter of said particular second group has a value of zero.

23. The method according to claim 17, further comprising:

determining whether a service parameter has been discarded based upon said control field.

24. The method according to claim 17, further comprising:

determining whether a class of service is available based upon said control field.

* * * * *